Oct. 13, 1970     A. E. GUSTAFSON     3,533,885
SPLICER MACHINE FOR TAPE
Filed Sept. 11, 1967     4 Sheets-Sheet 1
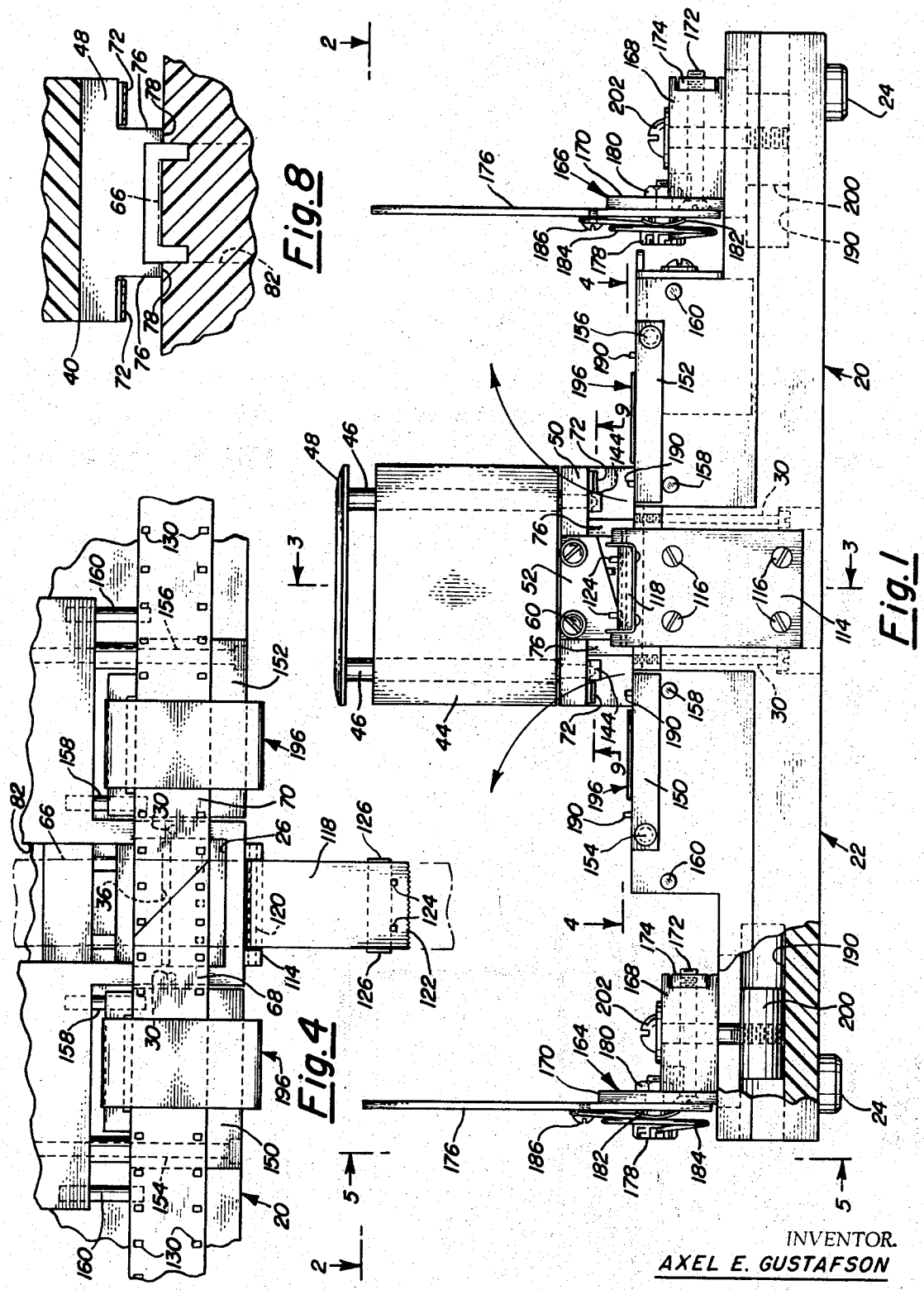
INVENTOR.
AXEL E. GUSTAFSON
BY
ATTORNEYS

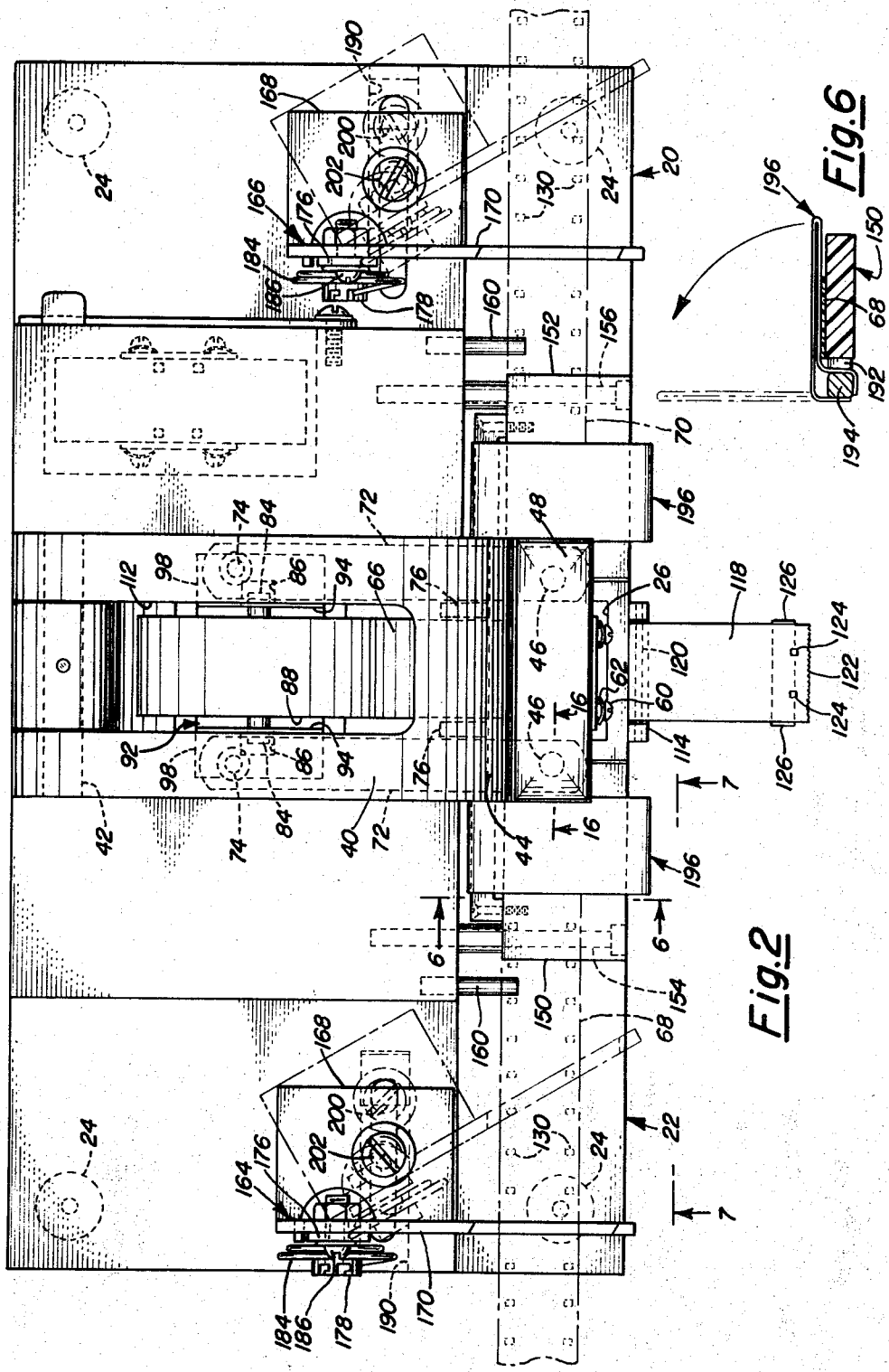

Oct. 13, 1970 — A. E. GUSTAFSON — 3,533,885
SPLICER MACHINE FOR TAPE
Filed Sept. 11, 1967 — 4 Sheets-Sheet 3
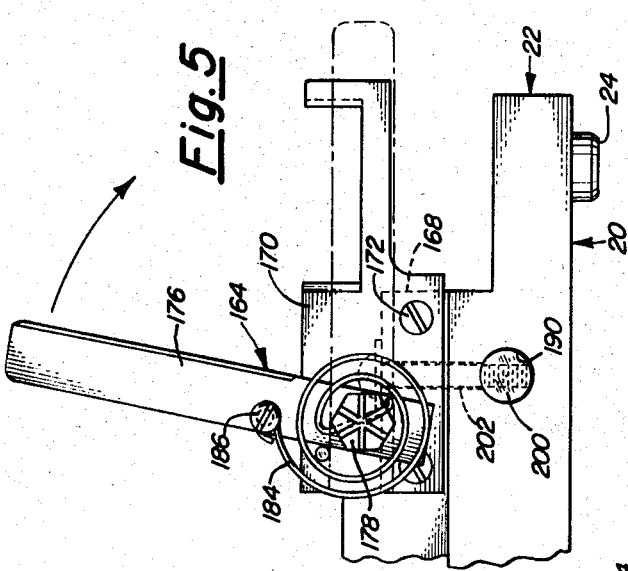
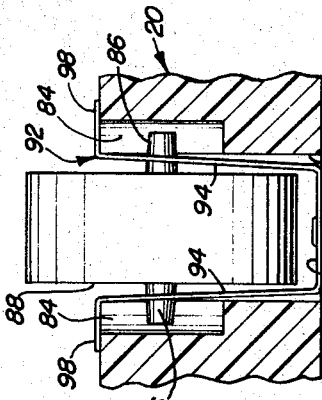
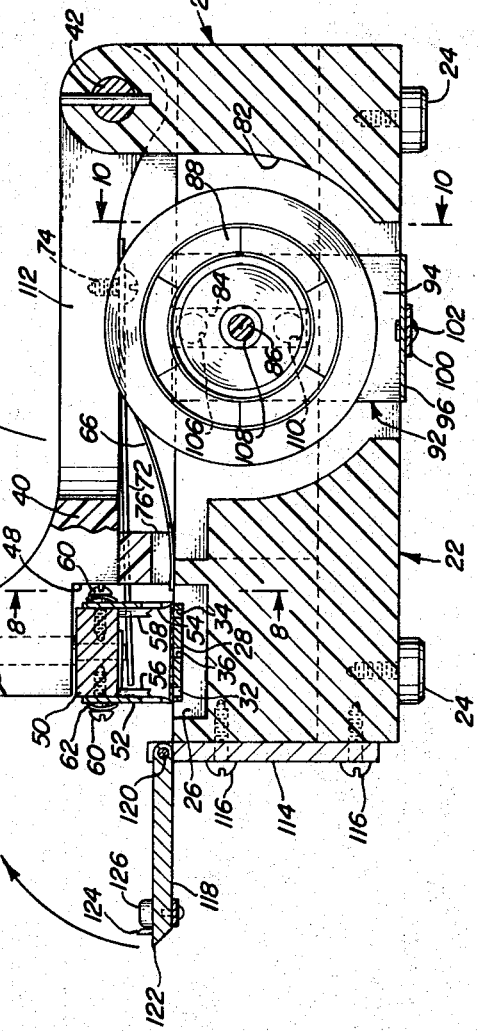
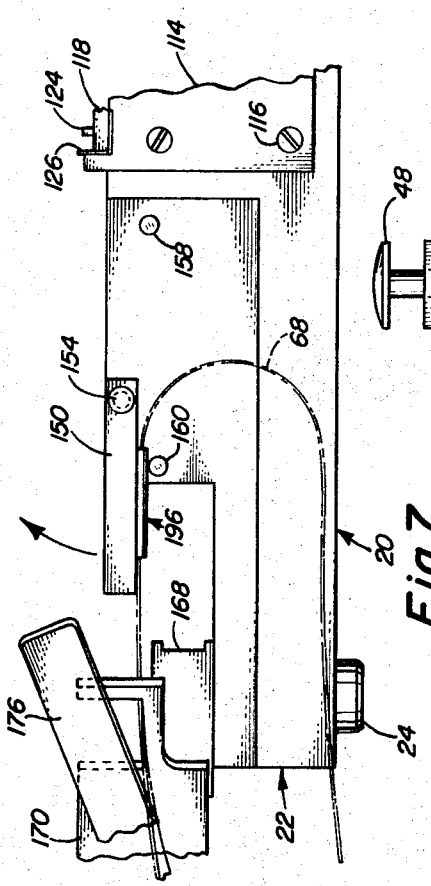
INVENTOR.
AXEL E. GUSTAFSON
BY
ATTORNEYS Oct. 13, 1970   A. E. GUSTAFSON   3,533,885
SPLICER MACHINE FOR TAPE
Filed Sept. 11, 1967   4 Sheets-Sheet 4
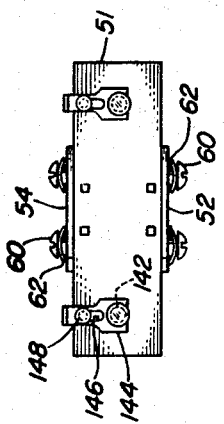
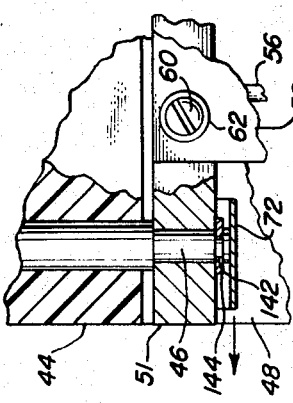
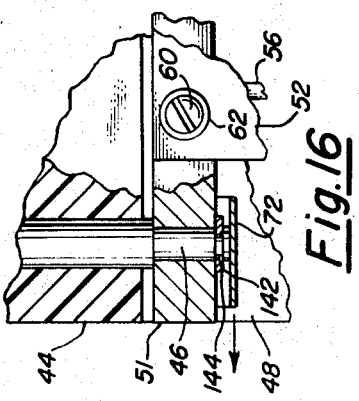
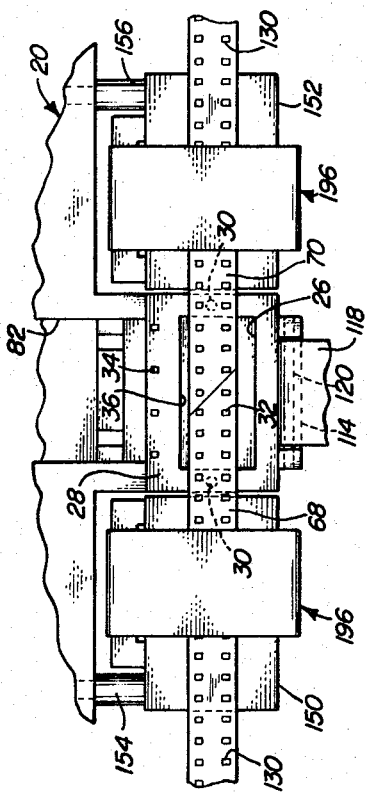
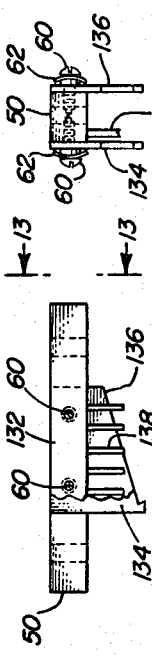
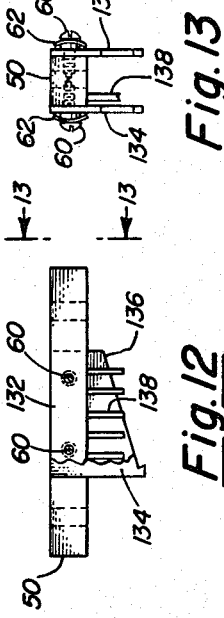
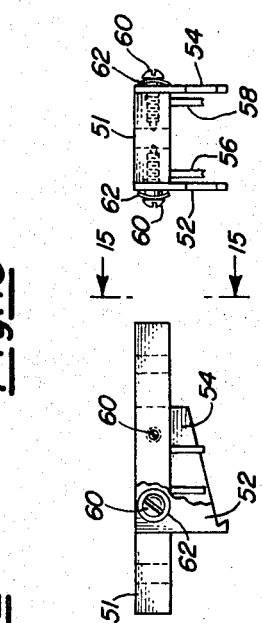
INVENTOR.
AXEL E. GUSTAFSON
BY
ATTORNEYS

United States Patent Office 3,533,885
Patented Oct. 13, 1970

3,533,885
SPLICER MACHINE FOR TAPE
Axel E. Gustafson, 703 S. Summit Ave.,
Sioux Falls, S. Dak. 57104
Filed Sept. 11, 1967, Ser. No. 666,833
Int. Cl. B31f 5/00; G03d 15/04
U.S. Cl. 156—505                                8 Claims

ABSTRACT OF THE DISCLOSURE

A tape splicer for joining sections of tape, which splicer employs an adhesive binding tape, and includes die elements which concomitantly effect perforation of the applied adhesive tape and cuts off the adhesive tape to the width of the tape to be spliced, and includes pivotally mounted carriers for the tape sections to be spliced, which carriers maintain the sections of tape in the correct positions for severing so that the severed ends, when disposed over the die, complement one another.

---

The splicer of the present invention includes relatively stationary and moveable blocks in the form of die elements, which perforates the joining adhesive tape to the severed tape and cuts off the adhesive tape to the width of the tape to be spliced. Tape cutters for severing the tape sections are disposed longitudinally along the tape sections, and carriers for the tape sections are disposed between the tape cutters and the die elements. These carriers are pivotally mounted and include mechanism for fastening the sections thereto, the position of the cutters with respect to the pivotal point of the carriers being such that after severing the sections while the carriers are in tape severing position, the severed sections are in complementary position when the carriers are oscillated to move the sections between the die elements.

In the embodiment illustrated, the cutters for severing the tape sections are adjustable whereby the transverse cutting action can be at desirable, selected angles. Since such selection is desirable, it is necessary to provide for varying the distance between the pivots of the carriers and the severing cutters in order to bring the severed ends of the tape section into abutting or near abutting position. In the embodiment illustrated, the severing cutters are movable longitudinally of the tape sections and are held in adjusted position.

The splicer carries a roll of adhesive tape and an element having a cutting edge for severing the adhesive tape. This element is mounted for movement from a cutting position to a position overlying the ends of the sections of the tape to be spliced while those ends overlie the perforated die whereby the element is used for pressing the adhesive tape onto the sections of the tape which are to be joined.

A carrier is provided for the roll of adhesive tape. This carrier with the roll is removably attached to the splicer.

Other features and the advantages of the present invention will be apparent from the following description, reference being had to the accompanying drawings wherein a preferred embodiment of the invention is illustrated.

In the drawings:
FIG. 1 is a front view of the splicer;
FIG. 2 is a top plan view of the splicer;
FIG. 3 is a section view taken along line 3—3 of FIG. 1;

FIG. 4 is a fragmentary view looking in the direction of arrows 4—4 of FIG. 1, but showing the sections of the perforated tape above the perforated die;
FIG. 5 is a fragmentary view looking in the direction of arrows 5—5 of FIG. 1;
FIG. 6 is a fragmentary view in section looking in the direction of arrows 6—6 of FIG. 2;
FIG. 7 is a fragmentary view looking in the direction of arrows 7—7 of FIG. 2, but showing the carrier for the left section of the perforated tape in the position at which the section is severed;
FIG. 8 is a fragmentary sectional view taken along line 8—8 of FIG. 3;
FIG. 9 is a fragmentary view looking in the direction of arrows 9 in FIG. 1;
FIG. 10 is a view partly in section, the section being taken along line 10—10 of FIG. 3, and showing a roll of adhesive tape in elevation;
FIG. 11 is a fragmentary view similar to FIG. 4, but omitting the section of perforated tape to show the perforations in the die;
FIG. 12 is a front view of the punch die for an eight millimeter tape splicer, but omitting part of the front cutter;
FIG. 13 is a view looking in the direction of arrow 13 in FIG. 12;
FIG. 14 is a front view of the punch die for a sixteen millimeter tape splicer, but omitting part of the front cutter;
FIG. 15 is a view looking in the direction of arrows 15—15 in FIG. 14; and
FIG. 16 is a fragmentary sectional view taken along line 16—16 of FIG. 2.

Referring more in detail to the drawings, the splicer 20 includes a main support or base 22, formed of any suitable material. This support is carried by feet 24. The front portion of the support is provided with an open top recess 26 (see FIGS. 3, 4 and 11) which is bridged from left to right by an elongated block in the form of a perforated die 28 which is held in place by screws or rivets 30. As shown in FIG. 11, this die is provided with a plurality of aligned and longitudinally disposed perforations 32, aligned and longitudinally disposed perforations 34, and an intermediate and longitudinally extending slit 36.

A lever 40 (see FIG. 3) is pivotally mounted on a pin 42 at the rear of the support 22 and extends forwardly. The forward portion 44 of the level extends upwardly to provide vertically extending guide for punch actuating shafts 46 having a head 48. The lever 40 is undercut as at 48 below the forward portion 44 for receiving a block 50 in the form of a die punch and adhesive tape cutter which is suitably attached to the lower end of shaft 46. This block 50, as shown in FIGS. 14 and 15 carries a removable cutter body 51 having downwardly extending cutters, namely, a front cutter 52 and a rear cutter 54, downwardly extending punches, namely, two front punches 56 and two rear punches 58. As shown in FIG. 3, the body 51 is designed for a sixteen millimeter splicer. The cutters are resiliently held in place by screws 60 and spring washers 62. The punches 56 and 58 are aligned, respectively, with perforations 32 and 34 in the die 28. Upon downward movement of the block 50, the lower ends of the cutters 52 and 54 engage, respectively, the front and rear edges of an adhesive tape 66 which overlies tape sections 68 and 70 and which sections overlie the die 28. The cutter can spread, respectively, forwardly and rearwardly due to the resilient supports thereof by the block 50.

The block 50 is normally urged upwardly by leaf springs 72, each having an end fixed to the support 22 by a screw 74 and the free ends extend below the shafts 46, whereby upon completion of downward movement of shafts 46, the block will be urged to the position shown in FIG. 3. A stop 76 on the underside of lever 40 is adapted to engage a lip 78 on the support 22 to limit the downward movement of the lever.

Referring now to FIGS. 3 and 10, it will be observed that the support 22 is provided with a substantially semicircular slot 82 which is open at the top and at the bottom, the axis thereof being parallel with the pivot pin 42 of the lever 40. Open top grooves 84 are formed on opposite sides of the slot 82 and aligned with the axis of the slot for receiving the protruding axle 86 of a roller 88 about which the adhesive tape 66 is wound.

A general U-shaped carrier 92, formed of stiff but flexible and resilient material, such as a suitable plastic, includes side legs 94, a connecting yoke 96 at the bottom and flanges 98 extending outwardly of the legs 94. These flanges rest on the top of support 22 when the carrier 92 is disposed in the slot 82. A carrier retainer 100 is pivotally mounted by rivet 102 on the underside of the yoke 96. Before inserting the carrier 92 into slot 82, the retainer is moved ninety degrees from that shown in the drawings, and, after insertion, the retainer is moved to the position shown in FIGS. 3 and 10, to thus latch the carrier and adhesive roll in position in the support 22. The legs 94 of the carrier are provided with three series of superimposed aligned holes 106, 108 and 110, any of the aligned holes are adapted to receive the axle 86 of roller 88. When first installing the roller, the axle is disposed in aligned holes 110, then when a portion of the adhesive tape is consumed, the axles are moved from holes 110 to the aligned holes 108, and after a major portion of the tape is consumed, the axle is moved into aligned holes 106. The lever 40 is slotted as at 112 to receive the upper part of the rolled adhesive tape 66.

The lower front of support 22 carries a plate 114 by screws 116. A plate 118 is carried by the upper part of plate 114 by a pivot pin 120. The extreme free end of plate 118 is tapered and serrated as at 122 to provide a cutting edge for the pressure sensitive tape 66. The plate 118 is shown in tape severing position in FIG. 3. Pins 124 extend upwardly from the outer portion of plate 118. The outer portion of the plate carries upwardly extending ears 126.

After the tape sections 68 and 70, which are to be spliced, are disposed above block 28, the tape 66 is pulled forwardly over the tape sections 68 and 70, between ears 126 and outwardly beyond the serrated cutting edge 122. The tape 66 is then pulled downwardly, pierced by the pins 124, to prevent side slippage when being severed by the cutting edge 122. The plate 118 is then moved 180° clockwise and then pressed downwardly, causing the pressure sensitive underside of the tape to adhere to the upper surfaces of the tape sections 68 and 70. The plate 118 is returned thereafter to the position shown in FIG. 3.

Then the block 50 is pushed downwardly to cause the cutters 52 and 54 to sever the adhesive tape 66. If the tape sections 68 and 70 are of the type having longitudinally aligned perforations, such as perforations 130 as in a sixteen millimeter motion picture film, the block will carry, as shown, the punches 56 and 58, which punches will perforate the adhesive tape 66, concomitantly with the cutting by cutters 52 and 54. It will be understood that the longitudinal spacing of the punches 56 and 58 is the same as the longitudinal spacing of perforations 130 in the tape sections 68 and 70.

If eight millimeter sections are to be spliced, the body 51 is removed and a body 132 is substituted. This body 132 is shown in FIGS. 12 and 13, it being provided with two downwardly extending cutters 134 and 136 at the front and rear thereof and a series of punches 138 extending longitudinally of the tape sections to be spliced. These punches are spaced longitudinally of one another equal to the perforations in an eight millimeter film. This size film employs only one set of perforations. The sections to be spliced lie forwardly and the punches 138 are aligned with the perforations in those sections. The rear cutter 136 is aligned with the slit 36 in die 28 and cutter 134 is aligned with the forward edge of that die. They cut the pressure sensitive tape 66 to the width of the eight millimeter tape.

The bodies 51 and 132 are mounted for ready attachment to block 50 (see FIGS. 9 and 16) showing how body 51 is removably attached to block 50. That block receives two vertically extending shafts 46, the lower portions of each having a circular groove 142 for receiving a bifurcated clip 144, the tines of which extend into the groove. The clip is provided with a longitudinally extending slot 146 for receiving a stud 148, which is suitably fastened to the underside of the block. By sliding clips in one direction, the body 51 is fastened to the block 50, and by sliding the clips in the opposite direction, the body is released from the block.

Referring now more particularly to FIGS. 1, 2, 4, 5, 6 and 7, it will be observed how the tape sections are cut to the proper length for complementing one another on the block or die 28. Two tape section carriers 150 and 152 are provided, respectively, for tape sections 68 and 70. These carriers are pivotally carried by pins 154 and 156, respectively, which pins extend forwardly from the front of body 22. These carriers are longitudinally aligned with the block or die 28 and are disposed on opposite sides of the block. Stops 158 limit the downward movement of the pivoted carriers, and the pivot pins 154 and 156 are in such position that when the carriers are in the position for splicing, the upper surfaces of the carriers preferably lie in the same horizontal plane as the upper surface of block 28. The carriers can be swung 180° from the positions shown in FIG. 1, the carrier 150 counterclockwise and the carrier 152 clockwise. Stops 160, extending forward from the support 22 limit the movement of the carriers. FIG. 4 shows the carrier 150 in its extreme left position, resting on a stop 160; this position is maintain during the severing operation of the tape section 68. Carrier 152 is also movable to a like but reverse position.

A pair of cutting mechanisms 164 and 166 are disposed outwardly of and aligned longitudinally with the carriers 150 and 152, respectively. Each of the cutting mechanisms includes a block 168. The cutter per se includes a stationary blade 170 fixed to the block by bolts 172 and nuts 174 and a cooperating pivotally mounted blade 176 which latter is attached to the blade 170 by a bolt 178 and nut 180. A washer type spring 182 is interposed between the head of bolt 178 and the movable blade 176 for resiliently urging the movable blade against the stationary blade. A spiral spring 184 encircles the bolt 178 and has one end attached to that bolt and the other end attached to the movable blade 176 by a screw 186. The spring 184 normally urges the movable blade to the position shown in FIG. 5.

In operating the splicer, the tape sections 68 and 70 are fastened, respectively, to the pivotally mounted carriers 150 and 152 while the carriers are in the positions shown in FIG. 1, with the respective ends of the tape sections overlapping one another on the block 28. When the tape sections are of the longitudinally perforated type, such as motion picture film, then in that event, upwardly extending pins 190 are provided on the upper surface (as viewed in FIG. 1) of the carriers 150 and 152. These pins are positioned so that when a tape section has its perforations receiving the pins, the punches on block 51 or block 132 register with the perforations on the tape therebelow.

The tape sections are held in fixed position on the carriers 150 and 152 in any suitable manner. The means for so doing is herein shown in FIG. 6, wherein the carrier 150 is provided with a slot 192 to form a rectangular section 194 at the rear thereof. A resilient and flexible retainer 196 is provided with portions which resiliently embrace the section 194 of the carrier for holding the retainer in the position shown in full lines in FIG. 6, in which position it overlies the tape section 68 and resiliently retains the tape section against the upper surface of the carrier. The retainer 196 can be turned upwardly and rearwardly to the position shown in dotted lines and retained in that position due to the resiliency of the material of the retainer. Thus, when the retainer is in the dotted line position, both of the operator's hands are available for adjusting the tape section onto the carrier.

After fastening the tape sections 68 and 70 onto the carriers 150 and 152, respectively, the carriers are turned 180°, carrier 150 being shown in its turned position in FIG. 7. Thereafter, the knife blades 176 are moved downward to sever the section tape. After severing, the carriers are returned to their original position, as shown in FIGS. 1, 2 and 4 at which positions the severed ends to the tape sections are in abutting relationship. The adhesive tape 66 is then applied and severed as aforesaid.

The ends of the tape section can be severed at various angles other than 90 degrees with respect to the longitude of the tape by pivotally mounting the blocks 168 onto the support 22. To accomplish this, horizontal recesses 198 are formed in the support 22 which receive nuts 200 which are prevented from turning by the walls forming the recess. Screws 202 extend through the blocks 168 and are in threaded relationship with the nuts. The cutter mechanism 164 are turned to the desired angle and then the blocks are adjusted longitudinally relative to the tape section to positions in which, after severing of the tape sections and oscillating the carriers to the splicing positions, the ends of the tape sections are in butting relationship. Thereafter, the screws are turned to fix the carriers to the selected adjusted position.

Thus, it is apparent that by reason of the oscillatably movable carriers 150 and 152, after the cutting mechanisms 164 are adjusted, it is necessary only to fix the tape sections 68 and 70 to the carriers, and after the severing actions, abutting relationship of the severed tape sections is assured.

While the form of embodiment herein shown and described, constitutes preferred form, it is to be understood that other forms may be adopted falling within the scope of the claims that follow.

I claim:
1. A tape splicer comprising in combination:
   (A) a support having:
      (1) a block for receiving longitudinally aligned sections of a tape to be spliced;
      (2) a second block having:
         (a) cutters extending longitudinally of the tape sections on the first mentioned block and spanning the first mentioned block;
      (3) means for supporting one of the blocks for movement relative to the other block for causing the cutters to function;
      (4) a pair of cutting mechanisms, one of said mechanisms being disposed on one side of the first mentioned block longitudinally of one of the tape sections, and the other of said mechanisms being disposed on the opposite side of the first mentioned block longitudinally of the other tape section, each of said cutting mechanisms having:
         (a) a cutter disposed transversely of the tape;
      (5) a pair of tape carriers extending longitudinally of the tape, one of said carriers being disposed between one of the cutting mechanisms and the blocks, and the other of said carriers being disposed between the other cutting mechanisms and the blocks;
      (6) means for pivotally supporting the carriers about axes disposed transversely of the elongated tape whereby loose ends of said tape may be lifted and tilted away from said second block and into position to be operated upon by one of said cutters, and returned to an abutting position on said first block;
      (7) means for supporting an adhesive tape in a position for transversely overlying the first mentioned tape sections and the first mentioned block.

2. A tape splicer as defined in claim 1, characterized in that each of said carriers includes:
   (5) (a) means for retaining a tape section, when severed in adjusted positions thereon.

3. A tape splicer as defined in claim 1, characterized in that each of said carriers includes:
   (5) (a) means for retaining a tape section, when severed in adjusted positions thereon, said means including:
      (i) a pin adapted to be received by a perforation in the tape, and
      (ii) means for retaining the tape about the pin.

4. A tape splicer as defined in claim 1 characterized to include:
   (8) means for pivotally supporting the cutting mechanisms.

5. A tape splicer as defined in claim 3, characterized to include:
   (5) (a) (iii) means for pivotally supporting the means (5) (a) (ii) on the carrier.

6. A tape splicer as defined in claim 3, characterized to include:
   (8) means for pivotally supporting the cutting mechanisms.

7. A tape splicer as defined in claim 6, characterized in that said means (5) and (8) are relatively adjustable longitudinally of the tape sections whereby the distance from the cutters to the means (8) for pivotally supporting the cutting mechanisms, when the cutters are in cutting position, is equal to the distance between the means (8) and the junction of the cut tape section at the first mentioned block, and further characterized to include:
   (9) means for adjustably fastening the movable means (5) or (8) to the support.

8. A tape splicer as defined in claim 7, characterized to include:
   (10) means having a cutting edge for adhesive tape;
   (11) means supporting the last mentioned means (10) for movement to overlie the adhesive tape when said adhesive tape overlies the first mentioned severed tape sections and the first mentioned block, whereby the means (10) can function to press the adhesive tape onto the severed tape sections;
   and further characterized in that each of said tape carriers (5) includes:
      (5) (a) means for the retaining the first mentioned tape, when severed in adjusted positions thereon, said means including:
         (i) a pin adapted to be received by a perforation in the tape section,
         (ii) means for retaining the severed tape about the pin,
         (iii) means for pivotally supporting the means (ii) on the carrier;
   (B) a carrier for adhesive tape; and (C) means for removable fastening the carrier (B) to the support.

References Cited
UNITED STATES PATENTS

| | | | |
|---|---|---|---|
| 2,460,619 | 2/1949 | Briskin | 156—507 |
| 2,499,686 | 3/1950 | Selmin | 156—505 |
| 2,668,576 | 2/1954 | Nichols | 156—505 |
| 2,672,180 | 3/1954 | Nichols et al. | 156—505 |

FOREIGN PATENTS 1,098,363  1/1961  Germany.

BENJAMIN A. BORCHELT, Primary Examiner

D. A. HART, Assistant Examiner

U.S. Cl. X.R.

156—502